(12) United States Patent
Clark

(10) Patent No.: US 9,337,695 B2
(45) Date of Patent: May 10, 2016

(54) SINGLE-LAYER COIL WITH ONE BENT ENDWINDING AND ONE STRAIGHT ENDWINDING

(71) Applicant: GE ENERGY POWER CONVERSION TECHNOLOGY LTD., Rugby, Warwickshire (GB)

(72) Inventor: Paul Eaton Clark, Warwickshire (GB)

(73) Assignee: GE Energy Conversion Technology LTD., Rugby, Warwickshire (GB)

( * ) Notice: Subject to any disclaimer, the term of this patent is extended or adjusted under 35 U.S.C. 154(b) by 233 days.

(21) Appl. No.: 13/887,400

(22) Filed: May 6, 2013

(65) Prior Publication Data
US 2013/0285502 A1    Oct. 31, 2013

Related U.S. Application Data

(63) Continuation-in-part of application No. 12/709,773, filed on Feb. 22, 2010, now Pat. No. 8,461,738.

(51) Int. Cl.
| | | |
|---|---|---|
| *H02K 3/28* | (2006.01) | |
| *H02K 3/12* | (2006.01) | |
| *H02K 15/06* | (2006.01) | |
| *H02K 7/18* | (2006.01) | |

(52) U.S. Cl.
CPC .. *H02K 3/28* (2013.01); *H02K 3/12* (2013.01); *H02K 15/063* (2013.01); *H02K 7/1838* (2013.01); *H02K 2213/12* (2013.01)

(58) Field of Classification Search
CPC ............. H02K 3/28; H02K 3/04; H02K 3/14; H02K 3/16

USPC .......................................... 310/179, 180, 208
See application file for complete search history.

(56) References Cited

U.S. PATENT DOCUMENTS

| | | | | |
|---|---|---|---|---|
| 4,346,320 | A * | 8/1982 | Davey ........................... | 310/179 |
| 4,446,393 | A * | 5/1984 | Finegold ....................... | 310/184 |
| 5,744,896 | A * | 4/1998 | Kessinger et al. ............ | 310/268 |
| 6,265,793 | B1 * | 7/2001 | Korenaga .................... | 310/12.06 |
| 6,570,273 | B2 * | 5/2003 | Hazelton .................... | 310/12.25 |
| 6,590,355 | B1 * | 7/2003 | Kikuchi et al. ............ | 310/12.06 |
| 6,806,612 | B2 * | 10/2004 | Nakamura et al. ............ | 310/208 |
| 6,833,648 | B2 * | 12/2004 | Gorohata et al. ............ | 310/180 |
| 6,894,418 | B2 * | 5/2005 | Jones et al. .................... | 310/208 |
| 6,940,202 | B1 * | 9/2005 | Chen et al. .................... | 310/184 |
| 2008/0010812 | A1* | 1/2008 | Clark .............................. | 29/605 |
| 2010/0225193 | A1* | 9/2010 | Clark ....................... | H02K 3/12 310/208 |

FOREIGN PATENT DOCUMENTS

| | | |
|---|---|---|
| EP | 0095962 | 12/1983 |
| EP | 1376818 | 1/2004 |
| EP | 1376828 | 2/2004 |
| JP | 2005-348461 | 12/2005 |
| JP | 2006033964 | 2/2006 |

* cited by examiner

*Primary Examiner* — Naishadh Desai
(74) *Attorney, Agent, or Firm* — Wood IP Law LLC

(57) ABSTRACT

The present invention provides an improved single-layer coil for a rotating or linear electrical machine. The coil has a first endwinding that is substantially straight to a longitudinal axis of the coil and a second endwinding that is bent relative to the longitudinal axis of the coil. The coil therefore has differently shaped endwindings with one end 12 being 'straight' and the other end being 'bent.'

6 Claims, 7 Drawing Sheets

SINGLE-LAYER COIL WITH ONE BENT ENDWINDING AND ONE STRAIGHT ENDWINDING

CROSS REFERENCE TO RELATED APPLICATION

This application is a continuation-in-part application and claims priority to U.S. application Ser. No. 12/709,773, filed Feb. 22, 2010, entitled "Single-Layer Coil with One Bent Endwinding and One Straight Endwinding."

FIELD OF THE INVENTION

The invention relates to coils, and in particular single-layer stator coils, having a particular shape. The coils can be used in physically large electrical machines.

BACKGROUND OF THE INVENTION

In physically large electrical machines it is quite common to use two-layer coils (also known as "diamond" or "pulled diamond" coils). However, in physically large low-speed electrical machines with a low number of slots-per-pole-per-phase it can be cheaper to use single-layer coils (also known as "concentric" coils). An example of a fully formed conventional single-layer coil for use with open slots is shown in FIG. 1. The coil is formed from one or more insulated conductors as a complete loop and has several turns. The coil is received in slots provided in a surface of a stator and includes axially-extending winding runs 2 that are received within the slots. The winding runs 2 are joined together at each end of the coil by endwindings 4 that protrude out of the ends of the stator.

Conventional two-tier and three-tier stator windings are shown in FIG. 2. In these stator windings the endwindings of the coils forming the inner tier or tiers (i.e. the tier or tiers closest to the end of the stator) are bent away from the axis of the stator by up to 90 degrees so that they may pass over the coils forming the outer tier or tiers. The endwindings of the coils forming the outermost tier do not need to pass over other coils and can be substantially parallel to the axis of the stator or, as shown in FIG. 2, they can be bent away from the axis of the stator by up to 90 degrees.

It is important to note that the orientation of both endwindings of each individual coil with respect to the axis of the electrical machine are always the same. Thus, in the case of the coils forming the outermost tier of a two-tier or three-tier stator winding then both endwindings of each individual coil will either be substantially parallel to the axis of the stator or bent away from the axis of the stator by up to 90 degrees. In the case of the coils forming the inner tier or tiers then both endwindings of each individual coil will be bent away from the axis of the stator by up to 90 degrees so that they may pass over the coils forming the outer tier or tiers.

The coils can be inserted in slots 6 provided in the radially inner surface of the stator 8 and can be arranged concentrically in groups as shown in FIG. 2.

SUMMARY OF THE INVENTION

The present invention provides an improved single-layer coil for an electrical machine. The single-layer coil of the present invention has differently shaped endwindings with one end being 'straight' and the other end being 'bent'.

That is, a coil includes two elongated generally planar, generally parallel, winding runs as well as two endwindings. In this configuration the coil is generally a loop defining an enclosed area between the winding runs. The surface of the winding runs that faces the enclosed area between the winding runs is the inner surface. The surface of the winding runs opposite the inner surface is the outer surface. A plane in which both of the winding runs lie is a 'transverse plane.' An endwinding is disposed at each end of the winding runs. Each endwinding includes a portion extending transversely relative to the first and second winding runs. Each endwinding portion has an outer surface and an inner surface. Each endwinding inner surface is a continuation of the winding runs' inner surface. Similarly, each endwinding outer surface is a continuation of the winding runs' outer surface. In the case of a 'straight' endwinding, the outer surface faces generally away from the coil enclosed area and the inner surface faces generally towards the coil enclosed area. As used herein, when a line extending generally normal to the outer surface of the endwinding portion extends in a plane that is generally parallel to the transverse plane, the endwinding is 'straight.' Conversely, and as used herein, an endwinding is 'bent' when a line extending generally normal to the corresponding outer surface of the endwinding portion extends in a plane that is not generally parallel to the transverse plane, including in a plane that is generally perpendicular to the transverse plane.

A pair of winding runs will typically extend between the first and second endwindings. The winding runs of the coil are received in winding slots provided in a surface of a stator of the electrical machine when the coil is positioned for use. In the case of a rotating electrical machine, the winding slots may be provided in a radially inner surface or a radially outer surface of the stator depending on the particular construction of the electrical machine.

The coils are of particular use—but not exclusively so—for physically large rotating electrical machines (i.e. those with large diameters). The pair of winding runs may be formed to be substantially parallel to each other in both the axial direction of the stator and the direction in which they extend into the stator in use. In this case all of the coils used to form a stator winding are substantially identical in shape, differing only in the position of the connection leads, which gives significant manufacturing advantages. The winding runs of each coil are preferably received in a pair of parallel winding slots. In other words, the winding slots that receive the parallel winding runs of a particular coil (i.e. a winding slot pair) are not oriented along a radius of the stator in the conventional manner but are instead substantially parallel to one another in the radial direction. The process of winding the stator may therefore be achieved simply by inserting the parallel winding runs of each coil into the parallel winding slots of a corresponding winding slot pair.

In the axial direction, the winding slots may be parallel to the longitudinal axis or they may be skewed in the conventional manner.

The coils can be used in rotating and linear electrical machines.

The present invention also provides a stator winding for use with a stator of an electrical machine, the stator winding comprising a plurality of coils as described above. The coils are received in winding slots provided in a surface of the stator. In the case of a rotating electrical machine, the winding slots may be provided in a radially inner surface or a radially outer surface of the stator depending on the particular construction of the electrical machine.

The stator winding preferably has two tiers. However, the stator winding may have three or more tiers depending on the particular construction (e.g. it may be a multi-tier stator winding). The stator winding can use a combination of single-layer coils as described above and conventional single-layer coils where both endwindings are the same. For example, in a three-tier stator winding, in the coil forming the innermost tier both endwindings can be bent and the coils forming the two outer tiers are as described above where one endwinding is straight and the other endwinding is bent.

Each tier of the stator winding may include one or more coils as described above. For example, a particular tier of the stator winding may include one coil per group or several coils per group. In the case where the tier includes several coils per group then the coils will be of different sizes. Such an arrangement is of particular use—but not exclusively so—for linear electrical machines.

In the case of a stator winding having at least two tiers, the stator winding may include a first set of single-layer coils having their second endwindings at one end of the stator and bent away from the axis of the stator and a second set of single-layer coils having their second endwindings at an opposite end of the stator and bent towards the axis of the stator. In the case of a rotating electrical machine, the coils in one of the first and second sets will cross the airgap that is formed between the stator and the rotor of the electrical machine (e.g. if the slots are provided in a radially inner surface of the stator then the second set of coils whose second endwindings are bent towards the axis of the stator will cross the airgap). Slot wedges are fitted in grooves near the slot openings and are used to securely retain the coils within the slots. Conventional wedges are driven from one or both ends of the stator but with coils or other obstructions that cross the airgap at one end then it would be acceptable to drive the wedges from the other end only.

If the slots are provided in a radially inner surface of the stator of a rotating electrical machine then it may be wound by inserting a first set of coils into the slots with their second endwindings bent away from the axis of the stator and inserting a second set of coils into the slots with their second endwindings bent towards the axis of the stator to form a two-tier stator winding. If the slots are provided in a radially outer surface of the stator of a rotating electrical machine then it may be wound by inserting a first set of coils with their second endwindings bent towards the axis of the stator and inserting a second set of coils into the slots with their second endwindings bent away from the axis of the stator to form a two-tier stator winding. In general terms, the coils whose second endwindings are bent away from the airgap between the stator and the rotor when positioned for use will be inserted into the stator first and it will be readily appreciated that winding the stator with the improved single-layer coils can be accomplished in a quick and easy manner. A third set of coils of conventional type where both endwindings are bent the same may also be inserted into slots provided in a radially inner or outer surface of the stator of a rotating electrical machine as part of the winding process.

The coils in one of the first and second sets will preferably be formed with connection leads at the 'bent' end and the coils in the other of the first and second sets will preferably be formed with connection leads at the 'straight' end. The coils are then inserted into the stator in such a way that the connection leads are all located at the same end of the electrical machine.

The coils can be pre-formed from a length of conductor by winding the conductor around suitable coil-forming members. The conductor may be a copper strip or tape of rectangular cross-section. However, other electrically-conductive materials such as aluminium can be used. The conductor may include one or more parallel strands of electrically-conductive material and the number of strands may be determined by a number of parameters such as the rated voltage and the power of the electrical machine. The conductor may be insulated by any conventional method.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
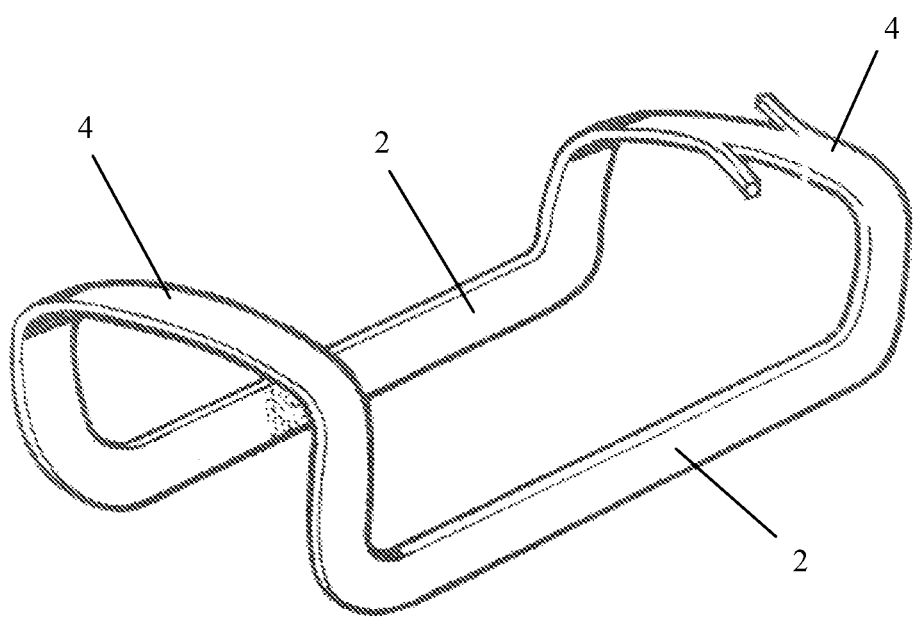
FIG. 1 is a perspective view of a conventional single-layer coil for an inner tier of a stator winding.
Figure 2:
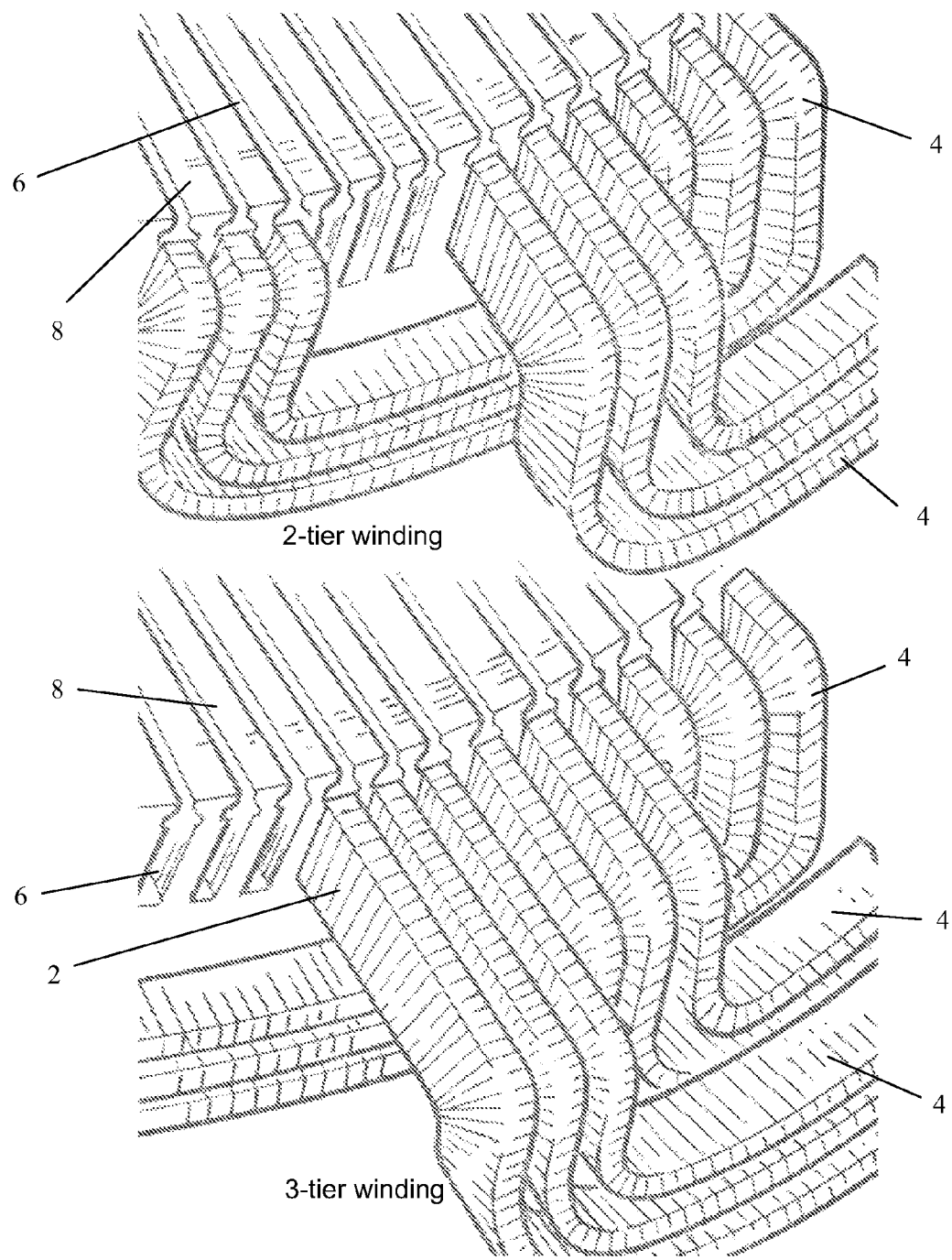
FIG. 2 is a perspective view of conventional two- and three-tier stator windings.
Figure 3:
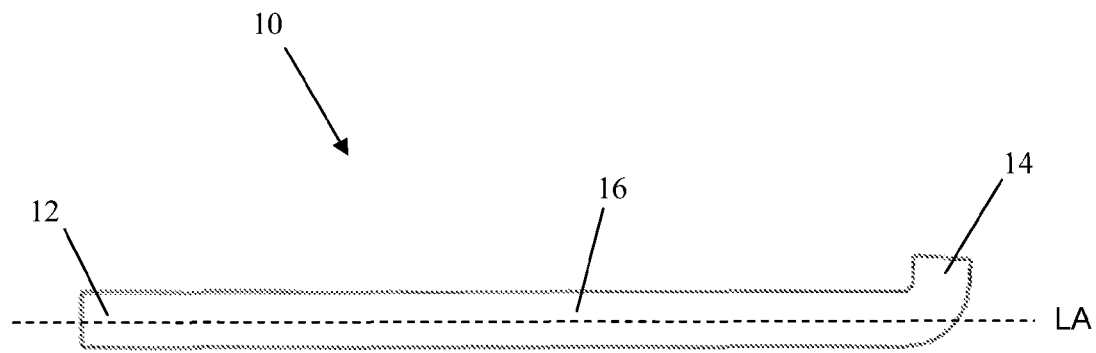
FIG. 3 is a side view of a coil according to the present invention.
Figure 4:
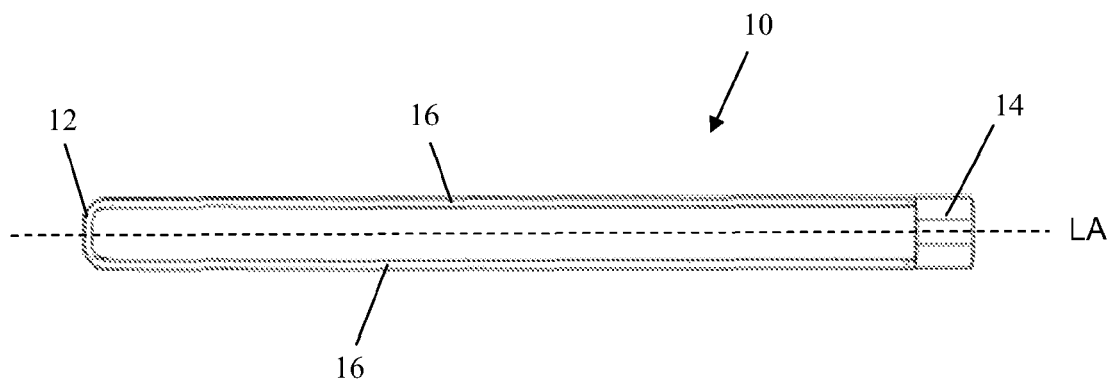
FIG. 4 is a top view of the coil of FIG. 3.

An example of an improved pre-formed single-layer coil 10 for a rotating electrical machine is shown in FIGS. 3 and 4. The coil 10 is formed from one or more insulated conductors as a complete loop and has several turns. When viewed from the side (FIG. 3) it can be seen that a first endwinding 12 is 'straight' and a second endwinding 14 is 'bent' such that it extends away from a longitudinal axis LA of the coil 10. The first endwinding 12 includes an outer surface 24 and an inner surface 26. The second endwinding 14 includes an outer surface 28 and an inner surface 30 (FIG. 6).

When viewed from the top (FIG. 4) it can be seen that the first and second endwindings 12, 14 join together two winding runs 16 of the coil. As described in more detail below, the winding runs 16 are parallel to each other in both the axial direction of a stator of the electrical machine and the direction in which they extend into the stator in use. However, a single-layer coil with a 'straight' endwinding and a 'bent' endwinding may also be formed with winding runs that are parallel in the axial direction of the stator of the electrical machine but which are designed to be inserted into slots that are oriented along a radius of the stator in the conventional manner.

Figure 5:
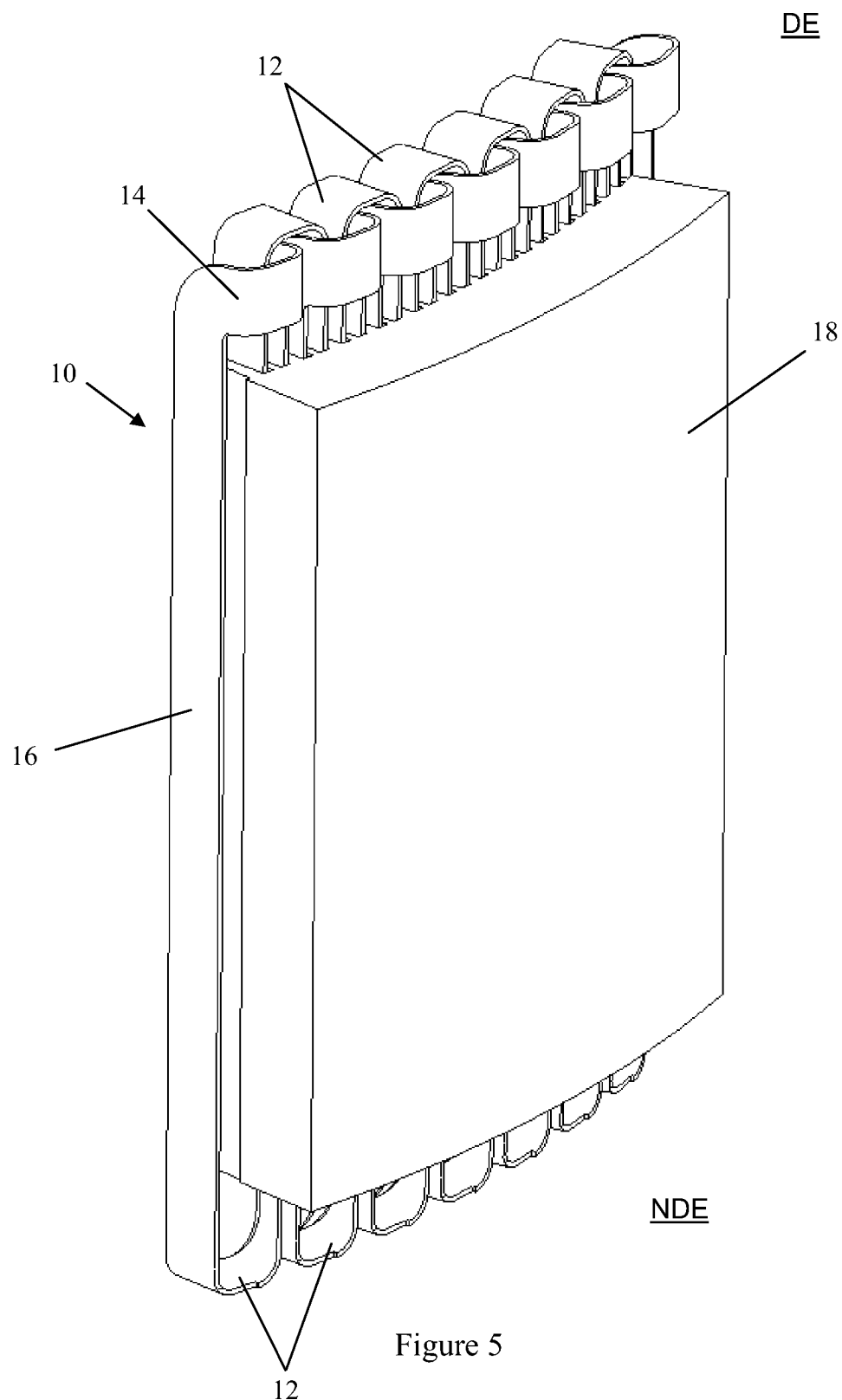
FIGS. 5 to 7 are perspective views of part of a stator for a rotating electrical machine incorporating a stator winding with a plurality of coils of the type shown in FIGS. 3 and 4.
Figure 6:
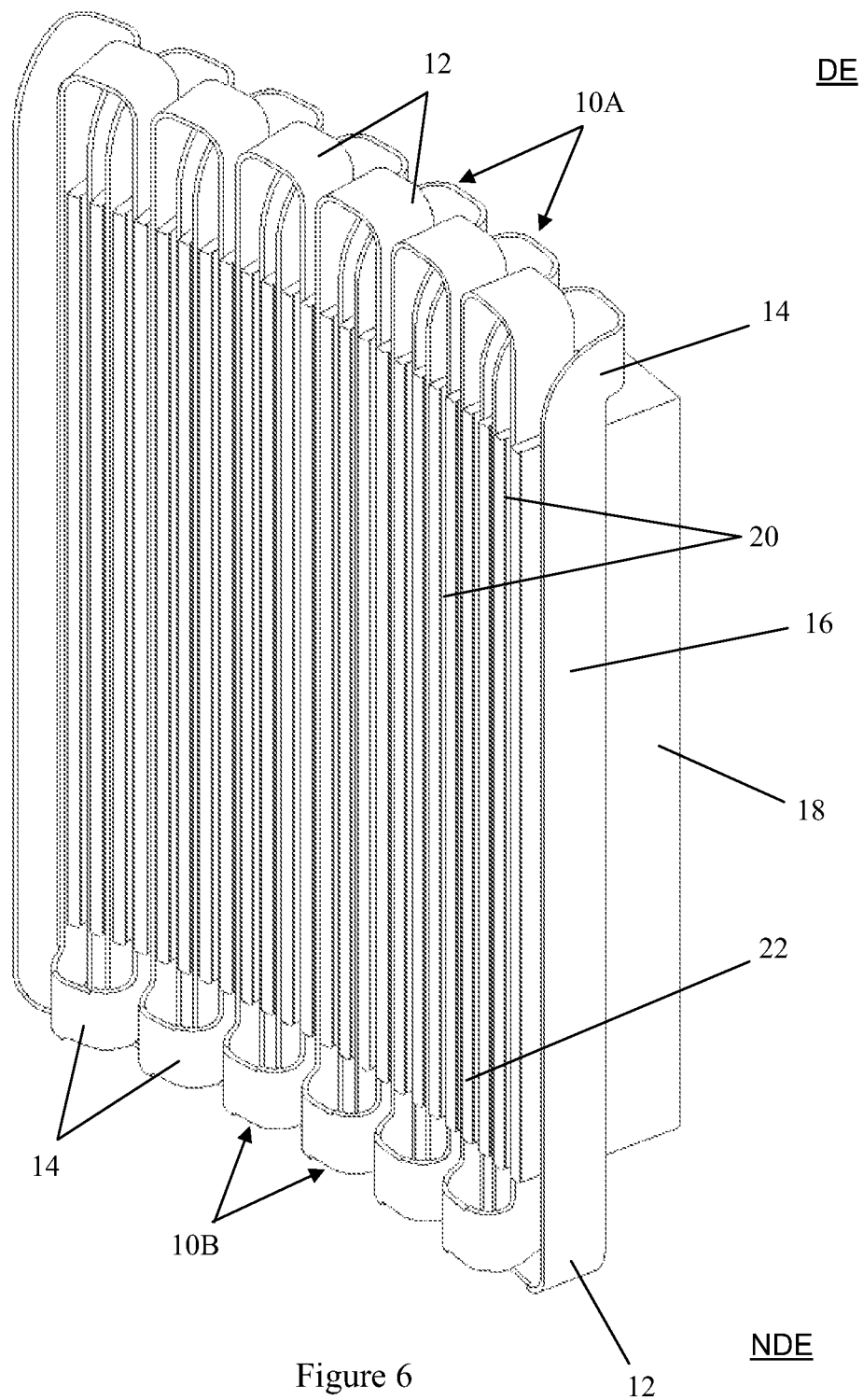
Figure 7:
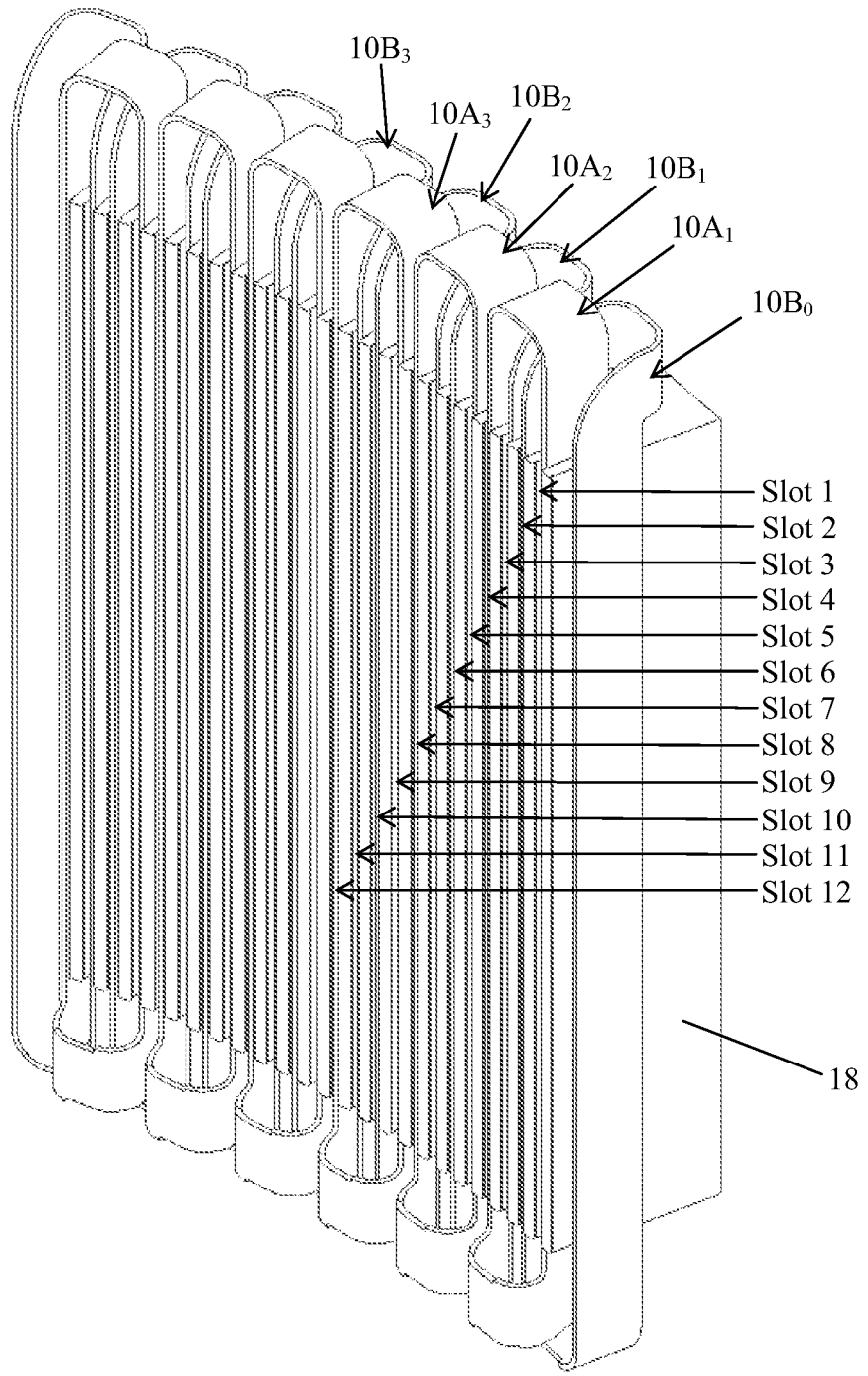

FIGS. 5 to 7 show part of a stator 18 for a rotating electrical machine. The stator 18 is constructed to surround a rotor (not shown) and would be separated from it by a small airgap. A plurality of winding slots 20 are formed in the radially inner surface of the stator 18 for receiving the winding runs 16 of a plurality of single-layer coils 10 of the type shown in FIGS. 3 and 4. The winding slots 20 are open-type slots with substantially parallel sides and are formed in such a manner that they are uniformly spaced about the radially inner surface of the stator 18. The central plane of each winding slot 20 is angled away from a radius of the stator 18 such that the winding slots that receive the winding runs 16 of any particular coil (i.e. a winding slot pair) are substantially parallel with one another. In other words, the central planes of the winding slots 20 forming each winding slot pair are substantially parallel. This is in direct contrast to conventional stators having radial slots where the central planes of the winding slots forming each winding slot pair are angled with respect to each other.

The winding slots 20 must be such that the narrowest parts of the intermediate stator teeth 22 are sufficiently strong to withstand the stresses they are put under during operation of the electrical machine.

Each coil 10 has a pitch of three winding slots and the winding runs 16 of each coil are therefore contained in winding slots 20 that are separated by two intermediate winding slots. The overlap of the coils 10 at each axial end of the stator 18 is accommodated in two tiers as shown.

A two-tier stator winding is formed of a plurality of single-layer coils 10 of the type shown in FIGS. 3 and 4. The stator is wound in such a way that half of the coils 10A are inserted with their 'bent' endwinding 14 at the driven/driving end (DE) of the stator 18 and the other half of the coils 10B are inserted with their 'bent' endwinding at the non-driven/driving end (NDE) of the stator. This is most clearly shown in FIG. 6, which shows the radially inner surface of the stator 18.

The 'bent' endwindings 14 at the driven/driving end of the stator 18 are bent away from the axis of the stator while the 'bent' endwindings at the non-driven/driving end of the stator are bent towards the axis of the stator. It will be readily appreciated that other configurations for the stator winding are possible.

The stator 18 is wound by first inserting the coils 10A whose 'bent' endwindings 14 are bent away from the axis of the stator into the corresponding winding slots 20. The coils 10A can be inserted in a non-overlapping arrangement and with their winding runs 16 in adjacent winding slots 20. Any twelve winding slots might therefore be represented schematically as follows:

| Slot | 1 | 2 | 3 | 4 | 5 | 6 | 7 | 8 | 9 | 10 | 11 | 12 |
|---|---|---|---|---|---|---|---|---|---|---|---|---|
| Coil | $10A_1$ | — | — | $10A_1$ | $10A_2$ | — | — | $10A_2$ | $10A_3$ | — | — | $10A_3$ |

The coils 10B whose 'bent' endwindings 14 are bent towards the axis of the stator are then inserted into the corresponding winding slots 20. The coils 10B can also be inserted in a non-overlapping arrangement and with their winding runs 16 in adjacent winding slots 20. However, the coils 10B overlap with the coils 10A to form a two-tier stator winding. The same twelve winding slots might therefore be represented schematically as follows:

| Slot | 1 | 2 | 3 | 4 | 5 | 6 | 7 | 8 | 9 | 10 | 11 | 12 |
|---|---|---|---|---|---|---|---|---|---|---|---|---|
| Coil | $10A_1$ | $10B_0$ | $10B_1$ | $10A_1$ | $10A_2$ | $10B_1$ | $10B_2$ | $10A_2$ | $10A_3$ | $10B_2$ | $10B_3$ | $10A_3$ |

The same slot/coil labelling has been applied to FIG. 7 for improved clarity.

Although all of the single-layer coils 10 of the stator winding have the same overall shape, it will be readily appreciated that half of the coils will have their connection leads at their 'straight' endwinding 12 while the other half of the coils will have their connection leads at their 'bent' endwinding 14. The coils 10 can then be inserted into the stator 18 such that all of the connection leads are located at the same end of the stator.

Figure 8:
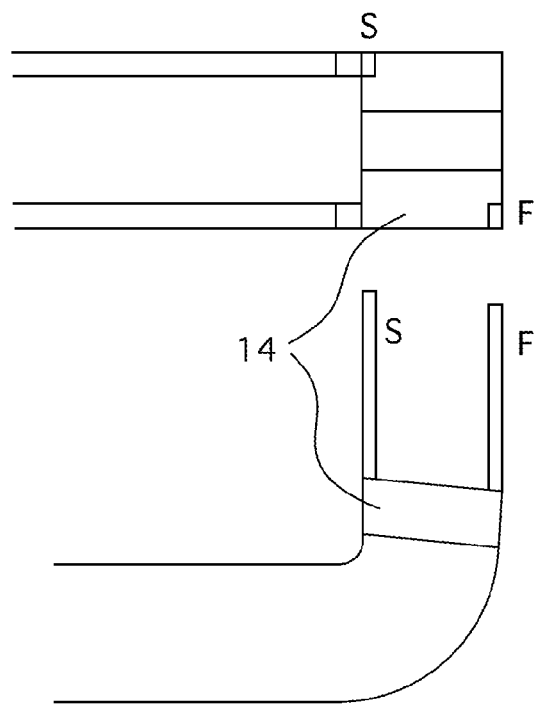
FIG. 8 is a top view and a side view showing the connection leads formed at the 'bent' end of a coil.
Figure 9:
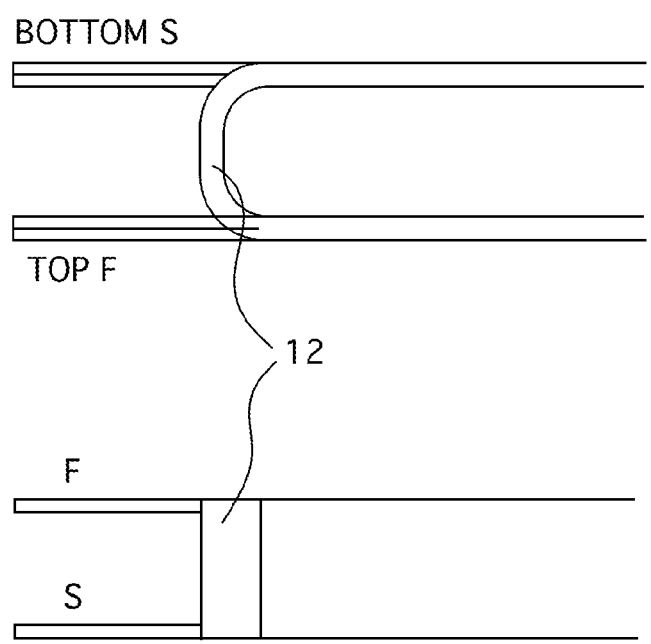
FIG. 9 is a top view and a side view showing the connection leads formed at the 'straight' end of a coil.

FIG. 8 shows a detail view of a coil 10 having connection leads at the 'bent' endwinding 14. Similarly, FIG. 9 shows a detail view of a coil 10 having connection leads at the 'straight' endwinding 12. In FIGS. 8 and 9 the letters S and F refer to the starting lead and finish lead, respectively. The connection leads of the plurality of coils 10 forming the stator winding are connected together in an appropriate manner.

What is claimed is:

1. A single-layer coil for an electrical machine, the single-layer coil comprising:
   a first winding run;
   a second winding run substantially parallel to the first winding run, the first and second winding runs extending in a first direction;
   a first endwinding joining from the first winding run and the second winding run at one end, the first endwinding extending in the first direction; and
   a second endwinding joining the first winding run and the second winding run at another end, the second endwinding extending in a second direction substantially perpendicular to the first direction.

2. The single-layer coil according to claim 1, for use with a stator of a rotating electrical machine, wherein the first and second winding runs are substantially parallel to each other in both the axial direction of the stator and the direction in which they extend into the stator.

3. A stator winding for use with a stator of an electrical machine, the stator winding comprising a plurality of single-layer coils, each coil having:
   a first winding run;
   a second winding run substantially parallel to the first winding run, the first and second winding runs extending in a first direction;
   a first endwinding joining from the first winding run and the second winding run at one end, the first ending winding extending in the first direction;
   a second endwinding joining the first winding run and the second winding run at another end, the second endwinding extending in a second direction, substantially perpendicular to the first direction.

4. The stator winding according to claim 3, wherein the stator winding is a multi-tier stator winding.

5. The stator winding according to claim 4, wherein each tier includes one or more single-layer coils.

6. A rotating electrical machine comprising:
   a stator having a plurality of a slots formed in a radially inner or outer surface; and
   a stator winding comprising at least one single-layer coil having:
   a first winding run;
   a second winding run substantially parallel to the first winding run, the first and second winding runs extending in a first direction;
   a first endwinding joining from the first winding run and the second winding run at one end, the first endwinding extending in the first direction; and
   a second endwinding joining the first winding run and the second winding run at another end, the second endwinding extending in a second direction substantially perpendicular to the first direction;

wherein the first and second winding runs of the at least one single-layer coil is disposed in a pair of slots substantially parallel to one another in a radial direction; and wherein the first and second winding runs of the at least one single-layer coil are substantially parallel to each other in both an axial direction of the stator and the radial direction.

* * * * *